July 17, 1951
D. E. LEWIS
2,560,965
DISK HUB AND BEARING ASSEMBLY
Filed June 30, 1947
2 Sheets-Sheet 1
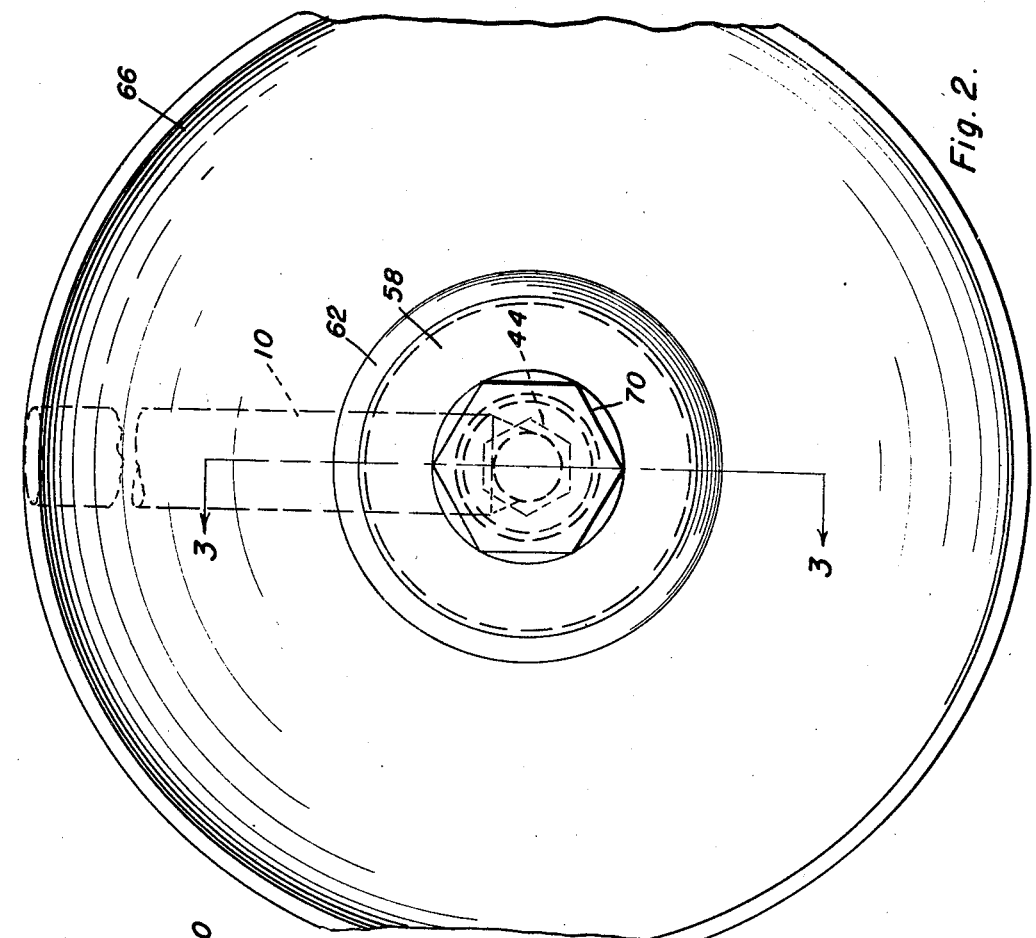
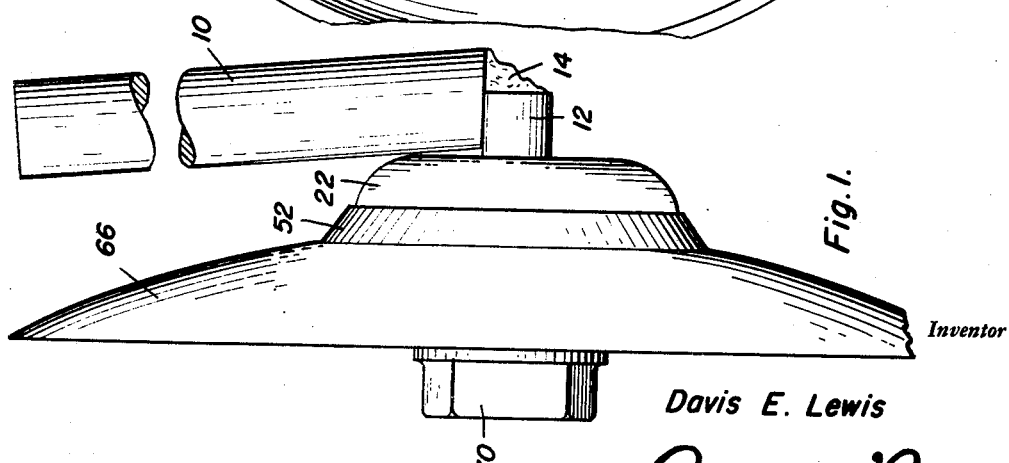
Inventor
Davis E. Lewis
By Clarence A. O'Brien
and Harvey B. Jacobson
Attorneys

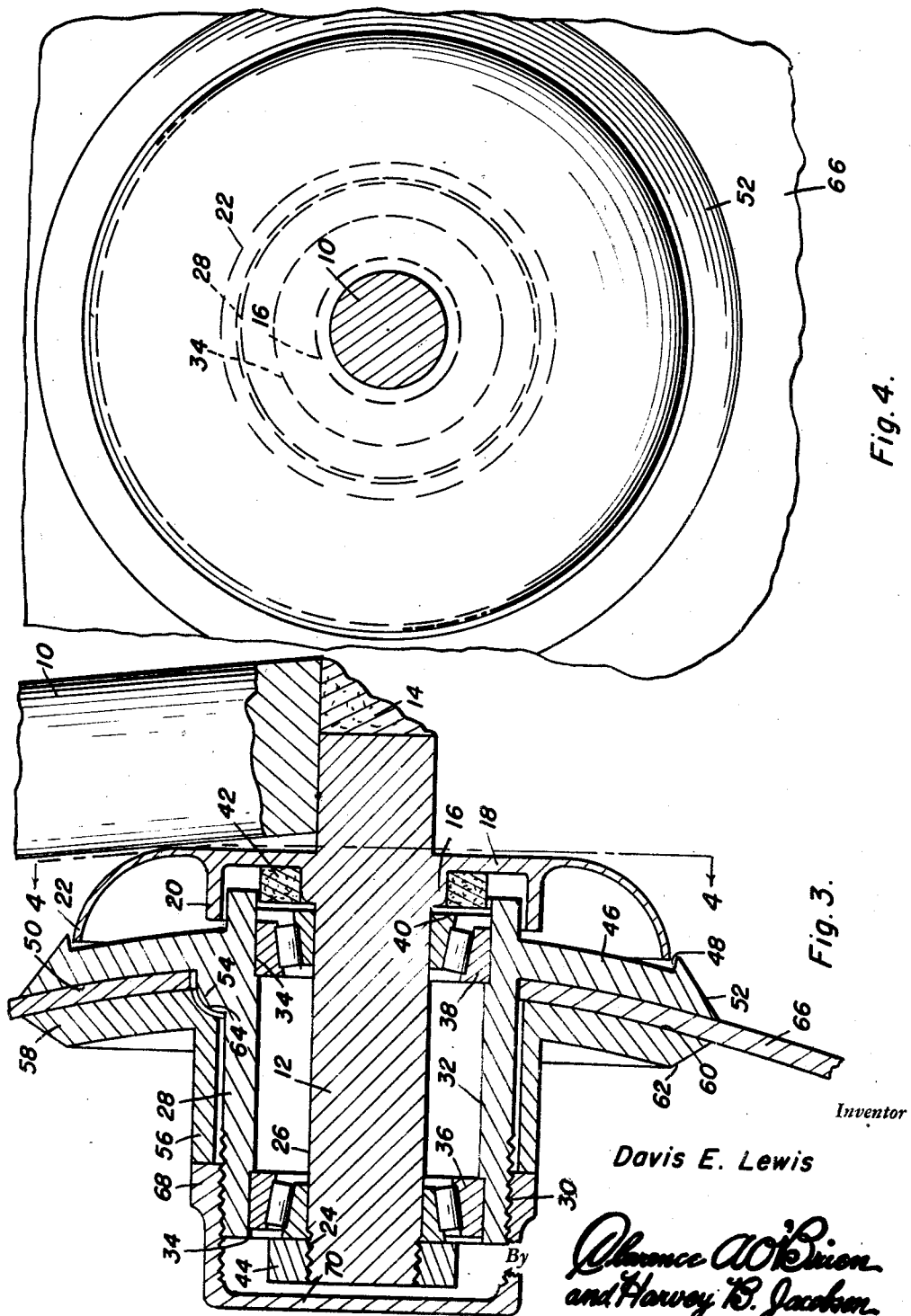

Patented July 17, 1951

2,560,965

UNITED STATES PATENT OFFICE 2,560,965

DISK HUB AND BEARING ASSEMBLY

Davis E. Lewis, Arcola, La.

Application June 30, 1947, Serial No. 758,157

2 Claims. (Cl. 308—19)

This invention relates to novel and useful improvements in a disc hub and bearing assembly, and more specifically pertains to an improved bearing and sealing means therefor for supporting the discs of an agricultural discer.

The principal object of this invention consists in providing a hub assembly for a disc where there is provided an improved bearing means for the hub assemblage, together with a simple construction of a multiple sealing means for preventing access of dust or other injurious substance to the bearing assembly, and simultaneously preventing leakage of grease or the like therefrom.

A further object of the invention consists in providing a hub and bearing assembly for discers, in accordance with the preceding object, wherein an improved and efficient arrangement is provided for readily attaching or replacing or removing agricultural discs from the device.

And a final important object of the invention to be specifically enumerated herein consists in providing an improved hub and bearing assembly for discers in accordance with the foregoing objects, wherein a single means is provided for sealing one end of the assembly and for simultaneously retaining and clamping a disc upon the hub thereof.

These, together with various ancillary objects of the invention which will later become apparent as the following description proceeds, are attained by this device, a preferred embodiment of which has been illustrated, by way of example only, in the attached drawings, wherein:

Figure 1 is a fragmentary side elevational view of the assembly attached to the lower end of a disc support rod;

Figure 2 is a fragmentary side elevational view of Figure 1 taken from the left end thereof;

Figure 3 is a fragmentary longitudinal vertical sectional view taken substantially upon the plane of the section line 3—3 of Figure 2; and Figure 4 is a fragmentary elevational view taken substantially upon the plane of the section line 4—4 of Figure 3.

Referring now more specifically to the accompanying drawings, wherein like numerals designate similar parts throughout the various views, reference is made chiefly to Figure 3, in which 10 designates a portion of a support rod for a disc of an agricultural implement, this rod being provided with a laterally extending axle 12 which, if desired, may be integrally formed upon the rod 10 or welded thereto as at 14.

As is well known in discer agricultural implements, a transverse beam, not shown, is provided with a plurality of downwardly extending rods, each of which supports one or more discs for rotation thereon, for working and breaking the soil as the implement is moved. The rod 10 is understood to be any of such known conventional disc supporting rods, and may, of course, be adjustably carried by the transverse beam of the implement in accordance with conventional practice, this construction forming no part of the instant invention.

Adjacent the supporting rod 10, the axle 12 is provided with an annular diametrically enlarged shoulder 16 from which extends an annular flange 18 provided with a laterally and outwardly extending annular rim 20 which, if desired, may be welded thereto and having its terminal edge provided with a dish-shaped rim 22 for a purpose to be subsequently set forth. If desired, the shoulder 16 may be provided as a detachable sleeve or washer in the axle, while flange 18 may be separately formed and welded thereto.

At its outer extremity, the axle 12 is provided with screw threads 24, while intermediate its ends the axle is preferably machined to provide a cylindrical bearing receiving surface 26.

A cylindrical hub 28 which is externally screw threaded, as at 30, at its outer extremity is provided with an internal bore 32 having terminal recessed portions 34 for seating and receiving roller bearing assemblies 36 and 38 by means of which the hub 28 is rotatably journaled upon the cylindrical bearing surface 26 of the axle 12.

A suitable washer or annular plate 40 is received within the outer extremity of the enlarged bore 34, at the rear of the bearing 38, in position to abut against the annular shoulder 16 when the hub and bearing assembly are thrust inwardly upon the axle 12. A suitable packing means 42 is seated upon the annular shoulder 16 and engaged by the washer or plate 40 to complete a bearing seal and grease retainer for the inward bearing 38 and bore 32, in conjunction with the annular flange 18 carried by the axle 12.

A hub-retaining nut 44 is screw-threadedly engaged upon the threads 24, for securing the hub and its bearing assembly in proper position upon the axle 12 and to compress the sealing packing 42, as will be apparent from Figure 3.

At its inward extremity, the hub assembly 28 underlies the annular rim assembly 20 in close sealing engagement and juxtaposition thereto whereby the overlying annular rim 20 constitutes a further seal for preventing the access of dirt to the packing assembly 42.

Adjacent its inward extremity, the hub 28 is provided with an annular flange 46 which is inclined slightly outwardly of the axle 12 with respect to the support rod 10, and which, upon its rear or inward surface, is provided with a laterally extending projection forming a shoulder 48. The forward or inward surface of the flange 46 is preferably of a concave contour for a purpose to be later described, while its outer edge tapers from the shoulder 48 toward the inner surface, as shown in Figure 3.

Inwardly of the concave surface 50, the sleeve 28 is provided with a radially extending boss or keying projection 54, whose utility will subsequently become apparent. Loosely and axially slidable upon the hub 28 is a sleeve 56 which is preferably secured against rotation relative to the sleeve portion of the hub 28, as by a longitudinal key or the like, not shown. At its inner extremity, the sleeve 56 is provided with a flange 58 which is complementary to the flange 46 above mentioned, and which is provided with a convex outer surface 60 which corresponds to the concave surface 50 above mentioned. The periphery of the flange 58 is provided with a beveled surface 62 corresponding to the surface 52, while the flanges are further provided with a keying recess 64 corresponding to and adapted to engage with the above mentioned key or lug 54.

The two flanges 46 and 58 with their adjacent surfaces 50 and 60 are constructed to compress and frictionally retain therebetween an agricultural disc 66 in tightly clamped relation, this disc being provided with an appropriate keyway for receiving the above mentioned key or lug 54, thereby retain the disc against rotation relative to the hub and sleeve assembly.

The outer extremity of the sleeve 56 extends sufficiently forward for ready engagement by the enlarged end 68 of a hub closure cap 70 which is screw threaded upon the screw threads 30 of the hub 28.

From the foregoing, it will be seen that the hub 28 and the disc 66 carried thereby are freely rotatable upon the axle 12 by means of the longitudinally spaced journal bearings 36 and 38 in opposite ends of the assembly, and that the outer journal bearing is sealed against the entrance of dirt or the escape of grease or lubricant therefrom by the cap 70 while the inner bearing assembly 34 is similarly sealed by the washer 40 and packing means 42. Further seals against the ingress of dirt or other detrimental substances are provided by the annular rim 20 having concentric sealing engagement with the external inner portion of the hub 28, and by the dish-shaped periphery 22 which underlies and is closely adjacent to the shoulder 48 of the disc-retaining flange 46.

It will be further noted that the retaining cap 70 serves the dual function of sealing and closing the outer end of the bore of the hub assembly 28, and also constitutes retaining means for urging the sleeve 56 and flange 58 into clamping engagement upon the disc 66.

Obivously, in this assembly a disc may be replaced or removed by simply removing the cap 70, whereupon the sleeve 56 and flange 58 may be readily withdrawn.

Since numerous modifications will readily occur to those skilled in the art after consideration of the accompanying specification and drawings, it is not desired to limit the invention to the exact construction shown and described, but all suitable modifications and equivalents may be resorted to falling within the scope of the appended claims.

Having described the invention, what is claimed as new is as follows:

1. In combination with a disk support and axle, a disk hub having a bore journaled on said axle, a spherical shaped concave disk retaining flange on said hub, a sleeve on said hub and a spherical shaped convex disk retaining flange on said sleeve, a flexible agricultural disk mounted between said convex and concave flanges, a cap on said hub abuttingly engaging said sleeve for compressing said disk between said flanges, a longitudinally and radially extending key on said hub, keyways in said disk and in said sleeve, said keyways receiving said key.

2. The combination of claim 1 wherein said key is an arcuate shaped rib formed at the intersection of said hub and said concave flange.

DAVIS E. LEWIS.

REFERENCES CITED

The following references are of record in the file of this patent:

UNITED STATES PATENTS

| Number | Name | Date |
|---|---|---|
| 716,496 | Tolles | Dec. 23, 1902 |
| 861,704 | Brew | July 30, 1907 |
| 981,984 | Doyle | Jan. 17, 1911 |
| 1,388,665 | Putnam | Aug. 23, 1921 |
| 1,405,033 | Heylman | Jan. 31, 1922 |
| 1,491,559 | Slick | Apr. 22, 1924 |
| 1,584,616 | Cothran | May 11, 1926 |
| 1,793,190 | Philips | Feb. 17, 1931 |
| 1,816,643 | Forsyth | July 28, 1931 |
| 2,439,449 | Caffese | Apr. 13, 1948 |